(No Model.)  C. H. FOX.  2 Sheets—Sheet 2.
REFRIGERATOR.
No. 504,804.  Patented Sept. 12, 1893.
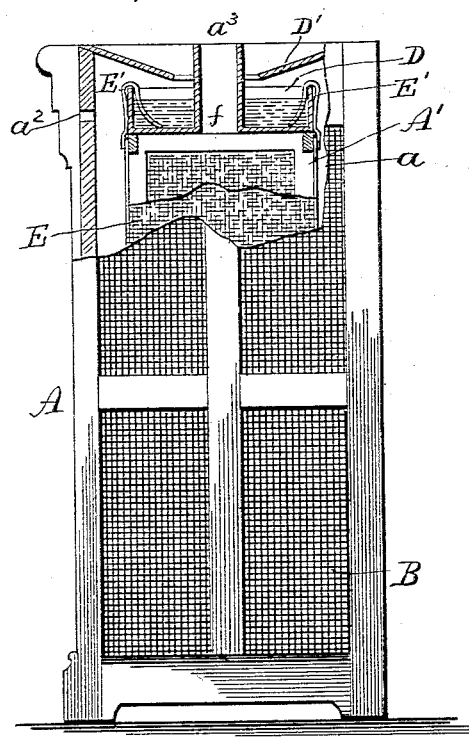 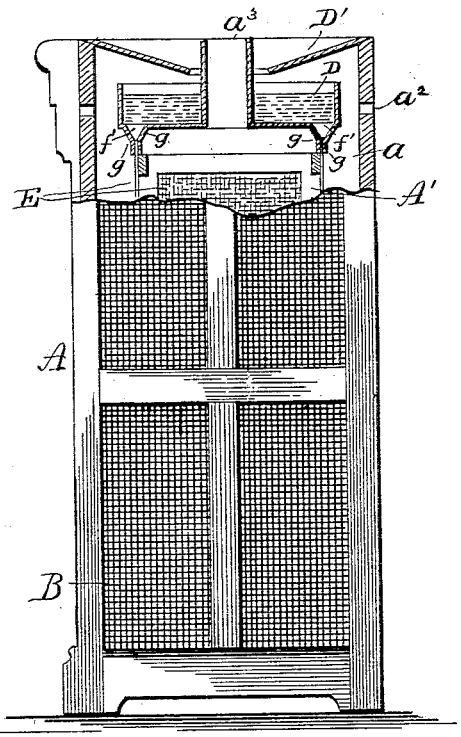
Witnesses
C. Nottingham
G. F. Downing
Inventor
C. H. Fox
By H. A. Seymour
Attorney

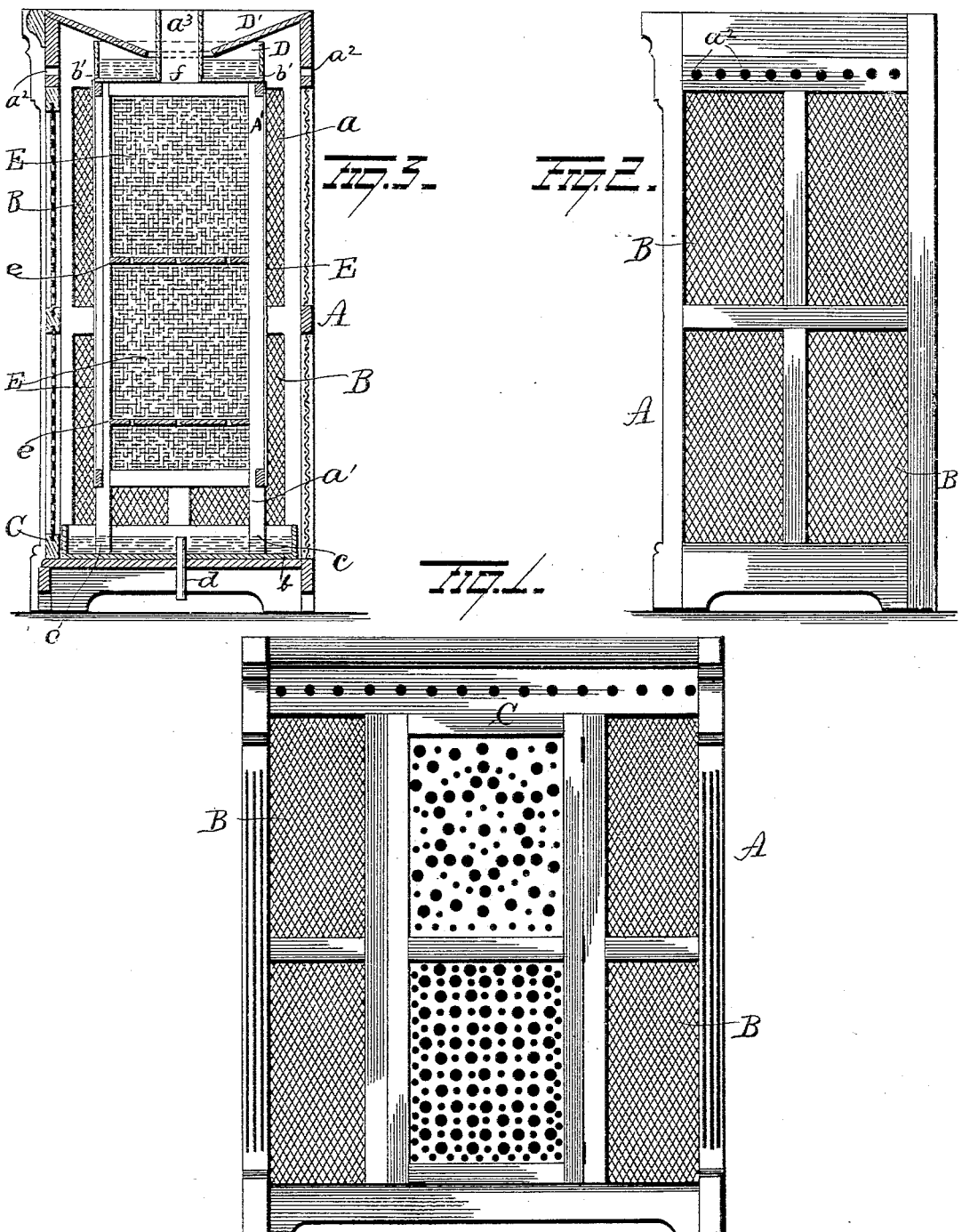

UNITED STATES PATENT OFFICE.

CHARLES HENRY FOX, OF DELANO, ASSIGNOR TO JAMES M. GILSTROP, OF DAUNT, CALIFORNIA.

REFRIGERATOR.

SPECIFICATION forming part of Letters Patent No. 504,804, dated September 12, 1893.

Application filed June 21, 1892. Serial No. 437,537. (No model.)

*To all whom it may concern:*

Be it known that I, CHARLES HENRY FOX, of Delano, in the county of Kern and State of California, have invented certain new and useful Improvements in Refrigerators; and I do hereby declare the following to be a full, clear, and exact description of the invention, such as will enable others skilled in the art to which it appertains to make and use the same.

My invention relates to an improvement in refrigerators,—the object of the invention being to provide simple and efficient devices whereby cool air may be produced within the refrigerator, by the evaporation of water and circulation of air, and without the employment of ice.

A further object is to construct a refrigerator in such manner that it shall be vermin proof.

A further object is to produce a refrigerator which shall be dust proof.

With these objects in view the invention consists in certain novel features of construction and combinations and arrangements of parts as hereinafter set forth and pointed out in the claims.

In the accompanying drawings: Figure 1 is a front view of my improved refrigerator. Fig. 2 is an end view. Fig. 3 is a sectional view. Figs. 4 and 5 are views illustrating modifications.

It may be here stated that my invention is applicable to numerous styles of refrigerators, but for the sake of convenience of illustration I will describe it in connection with a simple form of refrigerator or safe.

A represents an outer or main casing, which is merely a square or rectangular frame, inclosed by panels of screen cloth, or perforated wood or metal B. The door C is also covered with screen cloth or perforated material. Located within the main casing or frame A, is a smaller casing or frame A', the relative sizes of said casings or frames being such as to leave a space $a$ of four inches (more or less) between them. The outer casing or frame A is provided at the bottom with a water pan or reservoir $b$, and the inner casing or frame A' is provided with legs $c$ adapted to stand in said pan or reservoir. The inner casing or frame A' is provided with an air inlet $a'$ at a point above the pan $b$, through which air may enter the inner casing from the space $a$, air being permitted to enter said space through suitable openings $a^2$ at the top of the outer casing A, or said air inlets may be located at the bottom of the outer casing. The air which thus enters the inner casing A will escape through a flue $a^3$ passing through the center of a water reservoir D located on top the inner casing A'. By thus producing a circulation of air upwardly through the inner casing A', any warm air which may be therein, will be carried out through the flue $a^3$. The pan or reservoir $b$ is adapted to receive waste water in a manner which will hereinafter appear, and is provided with an overflow outlet $d$ so arranged as to maintain several inches (more or less) of water in the pan at all times. The inner frame or casing A' is provided with a series of shelves $e$, adapted to receive any articles which it is desired to keep cool and has an opening on the side opposite door C through which access is gained to the interior.

The sides of the frame or casing A' are covered with jute cloth or other suitable loosely woven absorbent material E, which material is secured at its upper end to the reservoir D which has an opening $f$ through its center for the accommodation of the flue $a^3$. This reservoir is to contain water, which is fed to the absorbent material E, through suitable openings $b'$ in said reservoir. By this means the water from the tank or reservoir D is gradually transmitted to the absorbent cloth E and permitted to moisten or wet it throughout its entire extent, said water finding its way into the pan or receptacle $b$ at the bottom of the refrigerator where it accumulates to the extent permitted by the overflow $d$.

Instead of feeding the water from the reservoir D to the absorbent material E as above explained, it may be fed by capillary attraction, through the medium of jute cloth, or other suitable absorbent material E'. One end or edge of the material E' is placed in the water in the tank or reservoir D and the other end or edge is made to terminate in contact with or in proximity to the absorbent cloth E.

Instead of supplying the absorbent material E with water from the tank D as above set forth, the arrangement shown in Fig. 5 may be adopted. In this arrangement, the bottom of the reservoir is provided with openings $f'$, from each side of which flanges $g$ depend, said flanges being adapted to receive between them the upper ends of the absorbent material E. When thus arranged the flanges $g$ form a sort of trough. The air which is admitted through the screen cloth or perforated material of the outer casing also passes through the wet absorbent cloth E of the inner casing and, when it reaches the interior of the inner casing, will have been cooled by the water contained in said absorbent cloth. Thus it will be seen that the interior of the inner casing or frame A', will be supplied by the circulation of air and the evaporation of water. Owing to the space between the outer and inner casings and the water in the pan $b$ at the bottom of the refrigerator, it will be impossible for vermin to reach the inner casing. The continual wet condition of the absorbent cloth covering the inner casing will also serve to exclude vermin. It is also evident that owing to the wet condition of the cloth covering the inner casing, the entrance into the casing of dust will be very effectually prevented. It is also evident that the upward circulation of air through the inner casing as above explained, will assist in causing the air to pass through the absorbent material covering the sides of the casing.

The reservoir D above referred to is provided with a top board D' which inclines inwardly toward the flue $a^3$ and terminates in proximity to said flue. By this means the reservoir may be readily filled by pouring the water on the inclined board D',—the water flowing therefrom into the reservoir.

Many slight changes might be made in the details of construction of my invention without departing from the spirit thereof or limiting its scope, hence I do not wish to restrict myself to the precise details of construction herein set forth, but, Having fully described my invention, what I claim as new, and desire to secure by Letters Patent, is—

1. In a refrigerator, the combination with an open frame work having an opening through the top, and sides composed of absorbent material, of a water reservoir arranged at the top of the refrigerator, a top board with inclining bottom located over the reservoir, said top board having an opening therein, a flue extending through this opening and in open communication with the interior of the reservoir, and means for supplying the absorbent material with moisture from the tank, substantially as set forth.

2. In a refrigerator, the combination with an outer frame, and an inner frame separated therefrom, of absorbent cloth covering the sides of said inner frame or casing, a reservoir arranged at the top of the refrigerator, a flue passing through said reservoir and communicating with the inner casing or frame, and means for conveying water from the reservoir to the absorbent cloth, substantially as set forth.

3. In a refrigerator, the combination with an outer frame or casing and an inner frame or casing separated therefrom, of absorbent material covering the inner frame or casing, a reservoir at the top of the refrigerator, means for conveying water from said reservoir to the absorbent covering of the inner casing, a pan at the bottom of the casing to receive water from the absorbent material, and an overflow in said pan constructed and arranged to maintain a constant supply of water in the pan, substantially as set forth.

4. In a refrigerator, the combination with an outer frame or casing, and an inner frame or casing separated therefrom, of air inlets at the bottom of the inner casing, air inlets in the outer casing, a flue communicating with the top of the inner casing, absorbent material covering the inner casing, and means for maintaining said absorbent material wet, substantially as set forth.

In testimony whereof I have signed this specification in the presence of two subscribing witnesses.

CHARLES HENRY FOX.

Witnesses:
THOMAS C. MORRISON,
W. H. WHITE.